United States Patent [19]
Crosello et al.

[11] Patent Number: 4,911,937
[45] Date of Patent: Mar. 27, 1990

[54] CHEWABLE, PEELABLE, LAYERED SOFT NOUGAT CANDIES

[75] Inventors: Vincent G. Crosello, Cedar Knolls; Carolina Calayan, Morris Plains; Allan H. Graff, Randolph, all of N.J.

[73] Assignee: Warner-Lambert Company, Morris Plains, N.J.

[21] Appl. No.: 211,498

[22] Filed: Jun. 24, 1988

[51] Int. Cl.[4] .............................................. A23G 3/00
[52] U.S. Cl. .................................... 426/103; 426/659; 426/660
[58] Field of Search ........................ 426/103, 660, 659

[56] References Cited
U.S. PATENT DOCUMENTS
4,656,039  4/1987  Weiss et al. .

OTHER PUBLICATIONS

Alikonis, "Candy Technology", Avi Publishing Co., Inc., Westport, Conn., Apr. 1979, pp. 94–107 & 196–201.
Stroud Jordan, "Confectionary Standards", Applied Sugar Laboratories Inc (1933), pp. 234–243.

Primary Examiner—R. B. Penland
Attorney, Agent, or Firm—Daniel A. Scola, Jr.; Henry C. Jeannette

[57] ABSTRACT

A chewable, peelable nougat candy is disclosed. The candy comprises at least two layers of nougat wherein each layer of nougat is made separable from the adjoining layer of nougat by the interposition of a compound coating. The individual layers of nougat may be of the same or different flavor, and the compound coating may contain flavoring agents.

23 Claims, No Drawings

CHEWABLE, PEELABLE, LAYERED SOFT NOUGAT CANDIES

FIELD OF INVENTION

This invention relates to soft chewable nougat candies containing multiple layers of nougat wherein each layer can be easily separated from the adjoining layers.

BACKGROUND OF THE INVENTION

In view of the large consumption of candy by consumers, there is always an interest in providing new, different, and unusual candies to satisfy the consumers demand for good tasting snack foods. A popular form of candy which has found wide acceptance is made from nougat compositions. These candies are soft and chewable and are available in a variety of flavors.

Nougats are perhaps the most complex and difficult of the generic confectionery bases to prepare. They are aerated confections whose density largely depends on a frappe element and texture on a syrup element along with its subsequent crystallization. Since soft, chewable nougats have a relatively high moisture content, different layers or portions of nougats having the same or different flavors cannot be placed together without the nougat layers merging into one inseparable candy mass.

It would be desirable to develop a soft nougat candy containing multiple layers of nougat in which each layer was of the same or different flavor, and in which each layer was separable from each other. In order to have such a candy, problems related to the sticking of the layers to each other would have to be overcome U.S. Pat. No. 1,771,981 issued to Mustin on July 29, 1930 is directed to thin rectangular strips of chewing gum whose surfaces have been coated with a normally brittle lozenge confection which will retain almost any flavor. This patent is also directed to a three-ply strip or bar of chewing gum comprising a thin sheet or bar of masticable gum placed between two layers of a lozenge confection.

U.S. Pat. No. 1,193,423 issued to Pryor on Aug. 1, 1916 is directed to a chewing gum and to a means for flavoring the chewing gum by providing a stick of highly concentrated flavor and a supply of neutral gum that is unflavored or mildly flavored gum. The flavor stick may be all one flavor or may contain a plurality of sections each containing a concentrated but different flavor Also disclosed is a tube of neutral gum, preferably with annular grooves to facilitate the partition of the tube, and within the central bore of the tube there is placed a flavor stick core. If desired the flavor core may be formed in sections and each section may carry a different flavor or the core can be of a single flavor. In any event, however, it is separated from the neutral gum by suitably dusting the adjacent surfaces to prevent sticking. The neutral tube sections are thus capable of being broken apart and used while the flavor stick core remains intact, or is used only to accentuate the flavor of the neutral gum, or to restore its flavor or to modify the flavor by combining different flavors.

U.S. Pat. No. 2,175,214 issued to Robinson et al on Oct. 10, 1939 discloses candy bars in which the breaking off or biting off of suitably sized sections for eating is greatly facilitated. This patent is also directed to a new type of candy bar such as of caramel or other consistency which will afford the convenience of small pieces of the candy yet avoid the necessity of individual wrapping of candy pieces. This patent discloses a transversely separable candy bar, by providing a unitary candy bar formed with dividing layers of an edible material, preferably itself of a type which would permit easy separation of consecutive short transverse sections of the bar either by breaking apart or biting the section from the bar. For example, a caramel bar is described which is formed of sections all bound together by thin separating layers or joints of easily separable edible material, preferably such as a normally soft and weak candy, as of fondant, fudge, or grained nougat, or other tender type of candy. It is disclosed that such a candy bar may be wrapped like any ordinary candy bar, yet at any future time may have its sections easily broken apart one at a time along the soft or easily frangible cementing layers, or may be bitten off along any of said layers upon turning down the wrapping sufficiently.

U.S. Pat. No. 2,927,029 issued to Long on Mar. 1, 1960 is directed to the easy separation of packaged bacon slices. It is disclosed that by coating the individual slices of bacon with a water swelling dust solution before assembling them into the package, the fat contained in the bacon can be prevented from physically sealing the slices together. The sodium salt of carboxymethylcellulose is exemplified as being highly satisfactory. It is disclosed that the top surfaces of the slices are dusted with the dry gum powder, that the slices are then shingled or laid upon one another with overlapping and encased in a cellophane wrapping in the normal commercial manner, and stored under normal refrigerator conditions.

U.S. Pat. No. 3,881,029 issued to Arenson on Apr. 29, 1975 is directed to a method of providing hamburger patties which do not adhere together It is disclosed that the adherence is prevented by placing a composition of matter consisting of fat materials in powdered form to each side of the hamburger pattie. According to the patent this present method is applicable to an extensive range of uncooked foods including foods of animal origin, such as meats, poultry and seafood that will adhere together when refrigerated or when frozen. It is disclosed that the fats and oils intended for use in preparing powdered fat products may be made from animal, vegetable, or marine oils alone or any combinations of them. It is disclosed that the powder must exist as a powder at minus 5° F., and also exist as a powder at a minimum of 90° F. and that 95% of the powder must pass through a 100 mesh screen at 95° F.

U.S. Pat. No. 3,940,497 issued to Arenson on Feb. 24, 1976 is directed to a method of preventing adherence of food products by applying a fat material in powder form to at least one surface of the food product. It is disclosed that the source of the fat material may be from hog fat and fats obtained from vegetables, marine, mineral or synthetic sources. Fats from milk, cream, or butter can also be used. Disclosure relative to the physical properties of the fats which can be used may be found in column 4 at about lines 22 et seq. Within these requirements it is disclosed that another useful powdered fat suitable for use is hardened vegetable oil. The hardened vegetable oil can be in powder form and is preferably a hydrogenated deodorized vegetable oil having a Wiley melt point of about 140°–150° F. and an iodine value of about 5 maximum. The fat material can be obtained by hydrogenation similar to that employed in preparing shortening used in baking, frying and other food operations, with the exception that the hydrogenation is continued until the iodine value has reached approximately five units. It is disclosed that usually amounts of powder from about 0.07% by weight to about 0.3% by weight and preferably from about 0.1% to about 0.2% by weight based upon the weight of the food product are employed. It is further disclosed that the amount employed can be varied so long as it is sufficient to prevent adherence during freezing or refrigeration of the food product.

U.S. Pat. No. 3,993,786 issued to Arenson on Nov. 23, 1976 is directed to a method of providing cheese slices that do not adhere together by utilizing a composition consisting of a fat material in powder form which is applied to one or both sides of cheese slices. It is disclosed that the fat material employed must be in powder form and can be obtained from any source. It is further disclosed that preferably the powder is made from anhydrous milk fat which is the same fat that is in the cheese but that powders made from other fats can be used. For example, oils or fats obtained from vegetable, marine, mineral, or synthetic sources can be used as well as animal fats in powder form. It is disclosed that the preferred fats in powder form have iodine values between 3 to about 10 and melting points between about 105° F. and about 1150° F. [sic] and softening point between about 40° F. and about 44° F. The most preferred fats employed in powder form have a melting point between 105° F. and about 110° F., and the softening point between about 40° F. and about 42° F.

U.S. Pat. No.3,900,574 issued to Warwick on Aug. 19, 1975 is directed to individual slices of cheese in a stack containing a thin coat of starch or mixtures of starch and a gum on at least one surface of each individual slice. It is disclosed that the starch or starch mixtures are applied to the cheese slices by spraying an aqueous dispersion of the starch or starch mixtures onto the surface of the cheese at some point prior to forming the cheese into stacked individual slices. It is further disclosed that it has been determined that starch and mixtures of the gum and a major amount of starch are suitable for effecting release of individual slices of cheese from a stack of cheese slices and that in contrast, other hydrocolloid materials (including the gum of the starch mixture) do not have the desire effectiveness for this purpose. The gum used in the starch mixture may be selected from vegetable gums, such as guar gum, carob bean gum, gum tragacanth and gum karaya; marine gums, such as carrageenan and alginate; cellulose gum, such as carboxymethyl cellulose and mixtures thereof.

U.S. Pat. No. 4,208,432 issued to Noborio et al on June 17, 1980 is directed to a powdery anti-stick agent for keeping the surface of a sticky surface of candy or chewing gum nonadhesive. The anti-stick agent comprises a compound selected from the group consisting of alpha-lactose, beta-lactose, calcium carbonate and mixtures thereof coated with a compound selected from the group consisting of saturated fatty acid monoglycerides and derivatives thereof. Saturated fatty acid monoglycerides and derivatives thereof which are useful contain a saturated fatty acid moiety having at least 12 carbon atoms and mono- or di- acetylation products of saturated fatty acid monoglycerides having an acid value of 2 or less and an iodine value of 2 or less. Examples of saturated fatty acid monoglycerides include lauric acid monoglyceride (glycerol monolaurate), palmitic acid monoglyceride (glycerol monopalmitate), stearic acid monoglyceride (glycerol monostearate) and the like.. Mono- or di- acetylation products of saturated fatty acid monoglycerides include monostearomonoacetyl glyceride, monolauro-diacetyl glyceride and the like. Among them, stearic acid monoglyceride, monostearomonoacetyl glyceride and monolauro-diacetyl glyceride are especially preferable.

U.S. Pat. No. 4,279,932 issued to Koshida et al is directed to a food product comprising a laminar sheet material comprising two edible sheets of different swelling properties, the two edible sheets being bonded together along at least a portion of the surfaces of the sheets. At least one of the sheets is capable of swelling and being deformed in water, and the laminar sheet is so deformed. It is disclosed that the two edible sheets of different swelling properties in water may be adhered together with an edible adhesive along suitable portions of the surfaces of the sheets, such as egg white, sodium alginate, potassium alginate, carboxymethyl cellulose, carrageenan, xanthan gum, guar gum, gum arabic and tamarind gum.

U.S. Pat. No. 4,308,289 issued to Huisman et al on Dec. 29, 1981 is directed to an improved process for treating skinned peanuts with an edible powder In this process peanuts that are split into halves are bonded together face to face simulating whole peanuts through the use of a substantially dry edible powder selected from the group consisting of sugar, cocoa, silica powder, flour, unmodified starch, physically modified starch, chemically modified starch, milk protein and mixtures thereof.

U.S. Pat. No. 4,656,039 issued to Weiss et al on Apr. 7, 1987 is directed to chewing gum products which are structured in layered form with all the water sensitive components of the formulation being placed in a core layer and encased in outer layers of water insensitive materials.

Pending Application Ser. No. 079,861 filed July 30, 1987 is directed to a stabilized chewing gum product containing a first portion chewing gum composition containing a gum base and an L-aspartic acid derived sweetener and at least a second chewing gum composition comprising a gum base and at least one flavoring agent, and a protective barrier film disposed between the first portion and the second portion in such a manner that the first portion and second portion are on opposite sides of the protective barrier film so that the L-aspartic acid derived sweetener of the first portion is present in the gum product substantially out of contact with the flavoring agents of the second portion. The protective barrier film can be formulated from many known film forming materials in amounts effective to form a film and to impart hydrophillic properties to the film that is formed. The film is substantially impervious to the flavorings employed so as to prevent passage of any flavor oils or aldehyde flavorings through the barrier film. The protective barrier film can be formed from materials selected from the group consisting of: gelatin; acacia gum; agar; algin and derivatives; carrageenan and salts thereof; arabinogalactan; baker yeast glycan; carboxymethylcellulose; carob bean gum; cellulose gum; furcellaran and salts thereof; guar gum; gum arabic; hydroxypropyl cellulose; hydroxypropyl methyl cellulose; irish moss gelose; karaya gum; locust bean gum; methylcellulose; methylethyl cellulose; pectin; propylene glycol alginate; propylene glycol ether of methyl cellulose; sodium carboxy methyl cellulose; tragacanth gum; xanthan gum; shellac; and mixtures thereof.

A desirable candy product would be one which contains multiple layers of nougat candy wherein each layer is of the same or different flavor, and wherein the candy can be eaten as an entire unit or the layers of nougat can be easily separated from each other and eaten separately. This invention provides just such a candy composition.

SUMMARY OF THE INVENTION

This invention provides a chewable, palatable nougat candy which is made up of multiple layers of nougat which are easily separable, (i.e., peelable) from each other. The layers are easily peelable as a result of the interposition of a compound coating or cream filler between each layer of nougat. The compound coating provides cohesiveness between the layers of nougat as well as allowing the individual layers to be easily separated from each other.

The term "compound coating" as used herein is defined to include cream filler and confectionery coating.

Thus, one embodiment of this invention provides a chewable, peelable nougat candy comprising at least two layers of nougat and a compound coating interposed between successive layers of nougat.

Another embodiment of this invention provides a method for rendering multiple layers of nougat cohesive to form a single candy unit while at the same time providing for easy separation and easy peelability of the nougat layers from each other by interposing a compound coating between successive layers of nougat.

DETAILED DESCRIPTION OF THE INVENTION

Although compound coatings (confectionery coatings) are known in the art, their use as an adhesive layer between successive layers of nougat to provide for cohesiveness as well as easy separability of the individual layers of nougat from each other is not known. Nougats are aerated confectionery compositions, well known in the art, which have a relatively high moisture content. Thus, this invention may utilize other types of aerated confectionery compositions. Without wishing to be bound by theory, it is believed that this high moisture content is responsible for the difficulty in combining separate nougat layers into one candy piece or unit while at the same time maintaining the easy separability of the individual layers To accomplish such a desirable result it is necessary to have an interposing layer between the nougat layers that is unaffected by the moisture content of the nougat The interposing layer must be inert to the nougat so that the nougat layer does not dissolve or otherwise affect the integrity of the interposing layer. The interposing layer can thus prevent the nougat layers from irreversibly sticking, melting, or blending together to form one candy mass. It has been discovered that compound coatings have the needed characteristics to function as suitable interposing layers. Compound coatings, which are known in the art, are different from candies such as fondants, fudges, grained nougats, tender type candies, and the like, which do not work in the present invention.

The compound coatings or cream filler utilized generally comprise an edible fat which is a solid at room temperature (about 20° C.), a dry milk substitute (—i.e., a powdered substitute) and a sweetener. Suitable edible fats have a melting point of about 76° to about 100° F., and representative examples include, but are not limited to palm kernel oil (hydrogenated or fractionated palm kernel oil), palm oil, cotton seed oil, coconut oil, soy oil, peanut oil, safflower oil, sunflower oil, cocoa butter, cocoa butter extenders, cocoa butter replacements, and the like, and mixtures thereof. Preferably hydrogenated or fractionated palm kernel oil is utilized An example of a commercially available edible fat is the product designated as Paramount C which is available from Durkee.

The milk substitute is selected from the group consisting of non-fat milk powder, imitation milk powder, non-dairy creamers, full cream powder, full milk powder and mixtures thereof An example of a commercially available milk substitute is the product designated as Cake Classic available from Kraft, Inc.

The sweetener (sweetening agent) used is a solid sweetener and may be selected from a wide range of materials including water-soluble sweetening agents, water-soluble artificial sweeteners, water-soluble sweetening agents derived from naturally occurring water-soluble sweeteners, dipeptide based sweeteners, and protein based sweeteners, including mixtures thereof. Without being limited to particular sweeteners, representative illustrations encompass;

A. Water-soluble sweetening agents such as monosaccharides, disaccharides and polysaccharides such as xylose, ribose, glucose (dextrose), mannose, galactose, fructose (levulose), sucrose (sugar), maltose, invert sugar (a mixture of fructose and glucose derived from sucrose), dihydrochalcones, monellin, steviosides, glycrrhizin, sugar alcohols such as sorbitol, xylitol, mannitol, maltitol, and mixtures thereof;

B. Water-soluble artificial sweeteners such as the soluble saccharin salts, i.e., sodium or calcium saccharin salts; cyclamate salts; the sodium, ammonium or calcium salt of 3, 4-dihydro-6-methyl-1, 2, 3-oxathiazine-4-one-2, 2-dioxide; the potassium salt of 3, 4-dihydro-6-methyl-1, 2,3-oxathiazine-4-one-2, 2-dioxide (acesulfame-K); the free acid form of saccharin; and the like;

C. Dipeptide based sweeteners, such as L-aspartic acid derived sweeteners, such as L-aspartyl-L-phenylalanine methyl ester (aspartame) and materials described in U.S. Pat. No. Pat. No 3,492,131, L-$\alpha$-aspartyl-N-(2,2,4,4--tetramethyl-3-thietanyl)-D-alaninamide hydrate, methyl esters of L-aspartyl-L-phenylglycerine and L-aspartyl-L-2, 5, dihydrophenylglycine, L-aspartyl -2, 5-dihydro-L-phenylalanine, L-aspartyl-L-(1-cyclohexylen-alanine; and the like.

D. Water-soluble sweeteners derived from naturally occurring water-soluble sweeteners, such as chlorinated derivatives of ordinary sugar (sucrose), known, for example, under the product designation of sucralose; and E. Protein based sweeteners such as thaumatoccous danielli (Thaumatin I and II).

In general an effective amount of edible fat, milk substitute, and sweetener are utilized to form the desired compound coating. Suitable amounts of edible fat are about 25 to about 50% by weight, with about 35 to about 45% by weight being preferred and about 38 to about 42% by weight being most preferred, wherein the by weight are based on the total weight of the compound coating.

Suitable amounts of milk substitute are about 15 to about 30% by weight with about 18 to about 25% by weight being preferred, wherein the by weight is based upon the total weight of the compound coating.

In general, an effective amount of sweetener is utilized to provide the level of bulk and/or sweetness desired, and this amount will vary with the sweetener selected. This amount will normally be about 30% to about 60% by weight of the compound coating when using an easily extractable sweetener. The water-soluble sweeteners described in category A above, are usually used in amounts of about 30% to about 50% by weight, and preferably in amounts of about 35% to about 45% by weight of the compound coating. Some of the sweeteners in category A (e.g., glycyrrhizin) may be used in amounts set forth for categories B-E below due to the sweeteners known sweetening ability. In contrast, the sweeteners described in categories B-E are generally used in amounts of about 0.005% to about 5.0% by weight of the compound coating with about 0.05% to about 2.5% by weight being usual and about 0.05 to about 0.4% by weight being preferred with about 0.10 to about 0.35% by weight being more preferred. These amounts are ordinarily necessary to achieve a desired level of sweetness independent from the flavor level achieved from flavor oils.

Preferred sugar based sweeteners are sugar (sucrose), corn syrup derived solids and mixtures thereof. Preferred sugarless sweeteners are the sugar alcohols, artificial sweeteners, dipeptide base sweeteners and mixtures thereof. Preferably the sugar alcohols are used in the sugarless compositions because they can be used at the desired level of sweetness. Preferred sugar alcohols are selected from the group consisting of sorbitol, xylitol, mannitol, and mixtures thereof. Most preferably sorbitol or a mixture of sorbitol and mannitol may be utilized. The gamma form of sorbitol is preferred. Generally, the sugar alcohols will not exceed about 50% by weight of the compound coating, and they may be present in amounts of about 35% to about 50% by weight of the compound coating. Preferably, when present, sorbitol does not exceed 50% by weight, mannitol does not exceed 20% by weight, and xylitol does not exceed 50% by weight of the compound coating. An artificial sweetener or dipeptide based sweetener may preferably be added to the compound coating containing sugar alcohols in the amounts described above for their category of sweetener. Of the artificial sweeteners the saccharin salts are preferred, and of the dipeptide based sweeteners aspartame is preferred.

Bulking agents may be used in place of the sweetener in the compound coatings, or they may be used to provide the necessary bulk when artificial sweeteners are utilized, or they may used in place of some of the sweetener (e.g., sucrose) to reduce the caloric content of the compound coating. The bulking agents may be used in amounts effective to provide the desired bulk and such amounts usually fall within the ranges described for the sweeteners. Examples of suitable bulking agents include but are not limited to: polydextrose, cellulose fibers, hydrogenated isomaltulose (available for example, under the product designation Palatinit), and the like.

The compound coatings may contain other ingredients including but not limited to: solid or liquid flavorings, colorants, emulsifiers (such as lecithin, glycerol monostearate, and the like), and the like. The flavorings and colorants that may be utilized are the same flavorings described below for use in the nougat layers; however, in the compound coatings the flavorings are usually used in amounts of about 0.05 to about 1% by weight, based on the weight of the compound coating, with about 0.15 to about 0.5% by weight being preferred.

Compound coatings (confectionery coatings) are commercially available and include the products designated as Ambrosia No. S-3920, Coronado Dark, and Pearl White Confectionery Coating which are available from Ambrosia Company, Milwaukee, Wis.; and J-280 Peanut Flavored Coating, and H-472.94Cl-145 Dark Confectionery Coating available from Wilbur Chocolate Company, Inc., Lititz, Pa.

In accordance with the description for the compound coating the compound coating may comprise cocoa butter, cocoa butter extenders or cocoa butter replacements, and chocolate liquor, and may also contain cocoa powder. Those skilled in the art will appreciate that such a composition is known in the art as chocolate.

The compound coating or cream filler is used in amounts effective to bind the successive layers of nougat together and to allow the easy separation of the layers of nougat from each other. Thus, the minimum amount of compound coating utilized is that amount which is required to completely coat one surface of a nougat layer so that when the coated surface is placed in contact with another layer of nougat the successive layers are not in contact with each other at their interface with the compound coating. Generally, about 1.5% to about 22% by weight, based on the weight of the nougat layer, with about 1.5% to about 20% being preferred and about 2% to about 19% being most preferred . of compound coating is used. For example, for a nougat layer about 1 inch wide by about 3 inches long by about 3/16 inch thick (1"×3"×3/16") a compound layer of about 1/64 to about 1/32 of an inch thick is applied. Similarly, for a nougat layer which is about 1"×1"×3/16" a compound layer about 1/64 to about 1/32 of an inch thick is applied. Those skilled in the art will appreciate that the thickness of the compound coating is independent of the nougat layer's surface area and that the maximum amount of compound coating that can be used is generally limited by the total thickness of the finished candy piece desired.

The nougat candies can have any number of layers desired taking into consideration the practical limit for the thickness of a candy piece. The nougat candy of this invention has at least two nougat layers which may be the same or different color and/or flavor. The nougat candy preferably has about 2 to about 6 nougat layers that are about ⅛ to about ¼ of an inch thick with about 2 to about 4 nougat layers being preferred. Preferably each layer is about 3/16 of an inch thick.

The nougat that is utilized in the present invention is well known to those skilled in the art. Nougats are aerated confections whose density largely depends on a frappe element and texture on a syrup element along with its subsequent crystallization. In the present invention both grained and ungrained nougat can be utilized.

The preparation of soft confections such as nougat, involves the combination of two primary components thereof, namely a high boiling syrup such as corn syrup or the like, and a relatively light textured frappe, generally prepared from gelatin, egg albumen, milk proteins such as casein, and vegetable proteins such as soy protein, and the like. The frappe is generally relatively light, and may, for example range in density from about 0.3 to about 0.8.

By comparison, the high boiled syrup, or "bob syrup", is relatively viscous and posses a higher density, and frequently contains a substantial amount of sugar. Conventionally, the final nougat composition is prepared by the addition of the "bob syrup" to the frappe under agitation, to form the basic nougat mixture. Further ingredients such as flavorings, oils, additional sugar and the like may be added thereafter also under agitation. A general discussion of the composition and preparation of nougat confections may be found in B. W. Minifie, CHOCOLATE, COCOA AND CONFECTIONERY: Science and Technology, 2nd Edition, AVI Publishing Co., Inc., Westport, Conn. (1980) at Pages 424–425.

The preparation of nougat candy generally involves the formation of a boiled sugar-corn syrup blend (bob syrup) which is added to a frappe mixture The bob syrup is heated to temperatures above 121° C. to remove water and to form a molten candy. The frappe is generally prepared from a whipping agent such as gelatin, egg albumen, gum arabic, dextrin, milk proteins such as casein, and vegetable proteins such as soy protein, and the like, to which is added a sweetener solution and rapidly mixed at ambient temperature to form an aerated sponge like mass. The molten candy or bob syrup is then added to the frappe and mixed until homogenous at temperatures between 65° C. and 121° C. The resulting mixture is then shaped and allowed to cool.

In general, the frappe comprises a whipping agent in amounts of about 1 to about 3% by weight of the frappe with about 1.5 to about 3% being preferred and about 2 to about 2.5% being most preferred; corn syrup in amounts of about 90 to about 96% by weight of the frappe with about 93 to about 96% being most preferred; and water in amounts of about 1.5 to about 5% by weight of the frappe with about 3% being most preferred. The sweeteners listed in category A above may be substituted for, in whole or in part, the corn syrup.

The bob syrup usually comprises sugar in amounts of 50 to about 70% by weight of the bob syrup with about 52 to about 68% being preferred and about 55 to about 65% being most preferred; corn syrup in amounts of about 30 to about 50% by weight of the bob syrup with about 37 to about 45% being preferred and about 35 to about 42% being most preferred; and a residual moisture content of about 2 to about 6% by weight of the bob syrup with about 2 to about 5% being preferred and about 2 to about 4% being most preferred.

The bob syrup and the frappe are combined to produce the nougat candy. The nougat generally is comprised of frappe in an amount of about 10 to about 40% by weight of the nougat with about 10 to about 20% being preferred and about 10 to about 15% being most preferred; and bob syrup in an amount of about 50 to about 75% by weight of the nougat with about 65 to about 72% being most preferred.

The nougat can also contain fats and oils in amounts of about 4 to about 10% by weight of the nougat with about 4 to about 8% being preferred and about 5 to about 7% being most preferred. Suitable fats and oils include fractionated fat, hydrogenated oils, partially hydrogenated oils, unsaturated oils, coconut oil, palm oil, palm kernel oil, cottonseed oil, safflower oil, sunflower oil, soy oil, corn oil and mixtures thereof. The term "fats" and "oils" are used interchangeably, although there may be differences as understood by the skilled artisan. "Fats" is generally a term to refer to the solid embodiment of the above-mentioned groups and "oils" refers to the liquid form.

A graining compound may also be optionally employed in the nougat to promote faster setting times for the final product. The graining compound is selected from the group consisting of fondant sugar, sugar, sorbitol crystals, lactose, commercial instant fondant powder and mixtures thereof. Preferably sugar is used. The graining compound when used is present in an amount from about 0.5% to about 4.0% by weight of the nougat with about 0.5% to about 3% being preferred and about 1 to about 2 being most preferred.

The flavorings (flavoring agents) that may be used include those known to the skilled artisan, such as, natural and artificial flavors. These flavorings may be chosen from synthetic flavor oils and flavoring aromatics, and/or oils, oleo resins and extracts derived from plants, leaves, flowers, fruits and so forth, and combination thereof. Representative flavor oils include: spearmint oil, cinnamon oil, oil of wintergreen (methylsalicylate), peppermint oils, clove oil, bay oil, anise oil, eucalyptus oil, thyme oil, cedar leaf oil, oil of nutmeg, oil of sage, oil of bitter almonds and cassia oil. Also useful are artificial, natural or synthetic fruit flavors such as vanilla, grape and citrus oils, including lemon, orange, lime, grapefruit and fruit juices and essences including apple, pear, peach, strawberry, raspberry, cherry, plum, pineapple, apricot and so forth. These flavorings may be used individually or in admixture.

Commonly used flavors include mints such as peppermint and menthol, artificial vanilla, cinnamon derivatives, chocolate, artificial chocolate, carob, powdered honey, powdered cocoa, chocolate liquor and various fruit flavors, whether employed individually or in admixture.

Flavorings such as aldehydes and esters including cinnamyl acetate, cinnamaldehyde, citral diethylacetal, dihydrocarvyl acetate, eugenyl formate, p-methylanisol, and so forth may also be used. Generally any flavoring or food additive such as those described in *Chemicals Used in Food Processing*, pub 1274 by the National Academy of Sciences, pages 63–258 may be used.

Further examples of aldehyde flavorings include, but are not limited to: acetaldehyde (apple); benzaldehyde (cherry, almond); anisic aldehyde (licorice, anise); cinnamic aldehyde (cinnamon); citral, i.e., alpha citral (lemon, lime); neral; i.e. beta citral (lemon, line); decanal (orange, lemon); ethyl vanillin (vanilla, cream); heliotropine, i.e., piperonal (vanilla, cream); vanillin (vanilla, cream); alpha-amyl cinnamaldehyde (spicy fruity flavors); butyraldehyde (butter, cheese); valeraldehyde (butter, cheese); citronellal (modifies, many types); decanal (citrus fruits); aldehyde C-8 (citrus fruits); aldehyde C-9 (citrus fruits); aldehyde C-12 (citrus fruits); 2-ethyl butyraldehyde (berry fruits); hexenal, i.e., trans-2 (berry fruits); tolyl aldehyde (cherry, almond); veratraldehyde (vanilla); 2, 6-diethyl-5-heptenal (melon); 2,6-dimethyloctanal (green fruit); and 2-dodecenal (citrus, mandarin); cherry, grape, strawberry shortcake, mixtures thereof; and the like.

The amount of flavoring employed is normally a matter of preference subject to such factors as flavor type, individual flavor, nougat base and strength desired. Thus, the amount may be varied in order to obtain the result desired in the final product. Such variations are within the capabilities of those skilled in the art without the need for undue experimentation. In general, amounts of about 0.1% to about 5.0% by weight of the nougat candy are useable with amounts of about 0.3% to about 1.5% being preferred and amounts of about 0.7% to about 1.2% being most preferred.

The colorants used in the present invention include pigments such as titanium dioxide that are incorporated into the nougat candy base and may be incorporated therein in amounts of up to 1% by weight. Also, the colorants may include other dyes suitable for food, drug and cosmetic applications, and known as F.D. &C. dyes and lakes. A full recitation of all F.D.&C. and D.&C. colorants and their corresponding chemical structures may be found in the Kirk-Othmer Encyclopedia of Chemical Technology, at Volume 5, pages 857–884, which text is accordingly incorporated herein by reference.

The nougat, both sugar and sugarless, may also contain effective amounts of acidulants such as malic acid, citric acid, tartaric acid, adipic acid, and mixtures thereof. Bulking agents may also be used in the nougat in a manner similar to that described above for their use in the compound coatings.

Those skilled in the art will appreciate that sugarless nougats can also be utilized and that such sugarless nougats may be made from formulations well known in the art. For example, the sugar in the nougat would be replaced by one or more of the sugarless sweeteners described above in categories A–E as in the discussion of the compound coating. Preferably the sugarless sweeteners hydrogenated starch hydrolysates, sorbitol, mannitol, xylitol, maltitol, hydrogenated isomaltulose (e.g. palatinit), lactitol, and galactitol, are used. The corn syrup in the frappe and the bob syrup would be replaced by hydrogenated starch hydrolysates, or solutions of the above described sugar alcohols.

Generally, in the sugarless nougats the sugarless sweeteners are used in the bob syrup in amounts of about 35 to about 90% by wt. of the bob syrup, and in the frappe in amounts of about 5 to about 20% by wt. of the frappe.

A sugarless, soft, chewable aerated nougat type candy made from hydrogenated starch hydrolysates (HSH) is described in pending U.S. application Ser. No. 941,257 filed Dec. 12, 1986, the disclosure of which is incorporated herein by reference thereto.

A sugarless, soft chewable nougat type confection can be made with HSH in which the nougat comprises about 5% to about 89% hydrogenated starch hydrolysate, and about 1% to about 10% cellulosics, wherein the cellulosics are a non-water soluble cellulosic and a water soluble cellulosic such that the total amount of cellulosics in the composition is about 1% to about 10% and the ratio of water-soluble to non-water soluble in the total composition is about 1:3 to about 3:1, a Whipping agent in an amount of about 0.1% to about 7.5%, and water in an amount of about 7% to about 12%, is produced from an admixture of about 10% to about 35% of a frappe component, a syrup component and about 2% to about −10% of a fat.

A particular sugarless chewable aerated confectionary (nougat) composition comprises:

(1) from about 10% to about 35% of a frappe component comprising:
 (a) a hydrogenated starch hydrolysate in an amount of about 3.0% to about 30%, preferably about 4.5% to about 26%, and most preferably about 5.5% to about 23%;
 (b) a Whipping agent in an amount of about 0.1 to about 7.5%;
 (c) a thickening agent in an amount of up to about 6%;
 (d) cellulosics in an amount up to about 10%; and
 (e) water in an amount of about 1% to about 7%, and preferably about 1.4% to about 6%;

(2) a syrup component comprising: a hydrogenated starch hydrolysate in an amount of about 19.5% to about 86%, preferably about 42% to about 84% and most preferably about 55% to about 82%; a sugar alcohol in an amount of up to about 50%, preferably about 45% to about cellulosics in an amount of about 10%, preferably about 3% to about 6%; and water in an amount of about 0.75% to about 5%;

(3) fat in an amount of about 2% to about 10%, preferably about 4% to about 8%; and (4) a material selected from the group consisting of colorants, flavorants, preservatives, sweeteners, graining agents and mixtures thereof;

wherein the cellulosics are a non-water soluble cellulosic and a water soluble cellulosic such that the total amount of cellulosics in the composition is about 1% to about 10% and the ratio of water soluble to non-water soluble cellulosics in the total composition is about 1:3 to about 3:1;

wherein the total amount of hydrogenated starch hydrolysate in the composition is about 35% to about 89%, preferably about 50 to about 80%, and most preferably about 65% to about 70%; and all percents herein are by weight of the final composition.

The hydrogenated starch hydrolysates employed may include those disclosed in reissue U.S. Pat. No. Re. 25,959, U.S. Pat. No. 3,356,811, U.S. Pat. 4,279,931 and various hydrogenated glucose syrups and/or powders which contain sorbitol, hydrogenated disaccharides, hydrogenated tri to hexasaccharides, and hydrogenated higher polysaccharides, or mixtures of any two or more of the above.

Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides gives different hydrogenated starch hydrolysates different properties. The degree of polymerization (DP) of various hydrogenated starch hydrolysates are presented in Table 1.

Products high in percentages of monomer (DP1) and dimer (DP2) will have higher sweetness levels and produce softer confectionery products, while products high in percentages of polymers will have low sweetness and produce confectionery products that have a hard texture. DP-1 for example could stand for sorbitol, mannitol, xylitol or any other hydrogenated monosaccharide. DP-1 is generally sorbitol due to the natural abundance of glucose in the corn syrup starting material. Similarly, the percent DP-2 defines the amount of hydrogenated disaccharides such as maltitol present while DP-3, DP-4, DP-5 . . . and so on define the amounts of higher hydrogenated saccharides present in the hydrogenated starch hydrolysate.

Preferably, the hydrogenated starch hydrolysate will have a DP-1 value of about 5% to about 10% and, a DP-2 of about 15% to about 65% and a DP-3 and higher content of about 30% to about 70%.

TABLE 1

Degree of Polymerization (DP) Values For Typical Hydrogenated Starch Hydrolysates.

| | DP1 | DP2 | DP3 | DP4+ | $DP_3$-$DP_6$ | $D_6+$ | DP3+ |
|---|---|---|---|---|---|---|---|
| Lycasin[1] | 6–8 | 50–55 | N.D.[3] | N.D. | 20–25 | 15–20 | 35–45 |
| Hystar[2] | | | | | | | |
| HM-75 | 15 | 50 | 12 | 23 | | | 35 |
| Hystar 3375 | 14 | 18 | 10 | 58 | | | 68 |
| Hystar 4075 | 13 | 23 | 12 | 49 | | | 51 |
| Hystar 5875 | 7 | 60 | 11 | 22 | | | 33 |
| Hystar 6075 | 14 | 8 | 10 | 68 | | | 78 |

[1] Lycasin is a trademark of Roquette Corporation
[2] Hystar is a trademark of Lonza, Inc.
[3] ND = Not Determined The whipping agent functions as a means of holding air introduced into the product to produce a uniform dispersity of air cells within the confection leading to a lower specific gravity and considerable modification to the texture.

Suitable sugarless whipping agents may include egg albumen, gelatin, vegetable proteins such as soy derived compounds, sugarless milk derived compounds such as milk proteins and modified milk proteins, and mixtures thereof.

Preferably, the frappe comprises, by weight of the sugarless confectionery product at least one whipping agent present in an amount of from about 0.5% to about 5% and mos preferably 0.5% to about 3%.

The thickening agent adds viscosity to the frappe mixture before whipping A thickening agent content of greater than 3% will produce a frappe mixture that is too viscous to whip. Preferably, the frappe thickening agent will be present in an amount of about 0.1% to about 1%. In the preferred range, the Frappe thickening agent will add sufficient viscosity to the frappe component so that air entrapment will be enhanced during the whipping process. The frappe thickening agent has an additional smoothing effect on the confectionery composition thereby improving mouthfeel.

Preferred thickening agents are hydrocolloids, more commonly referred to as "gums." Hydrocolloids are long-chain, high-molecular weight polymers that disperse in water to give a thickening and sometimes a gelling effect. Both natural and synthetic hydrocolloids are useful. Natural gums are derived from various plant and animal sources. Illustrative, non-limiting examples of natural hydrocolloids suitable for use include: plant exudates such as arabic, tragacanth, karaya, ghatti; seaweed extracts such as agar, alginates, carrageenans, furcellaran; plant seed gums such as guar, locust bean, psyllium, quince, tamarind; non fermentable cereal gums such as corn hull gum; plant extracts such as pectin, arabinogalactan; and fermentation gums such as dextran, xanthan and curdlan. Synthetic hydrocolloids or synthetic gums are gum-like chemically synthesized polmers having no structural relationships to natural gums. Illustrative non-limiting examples of synthetic hydrocolloids suitable for food include: polyvinylpyrrolidone, carboxyvinyl polymers, and polyethylene oxide polymers.

Thickening agents may be used individually or in mixtures.

The cellulosics may be incorporated entirely in the frappe component, entirely in the syrup component, partially in each component or into the nougat formed after blending the frappe and syrup. Preferably the cellulosics are present in an amount of about 2% to about 9% and most preferably about 4% to about 7%. Preferably, the water soluble and non-water soluble cellulosics are present in a ratio of about 1:2 to about 2:1 and most preferably are present in a ratio of about 1:1. In a preferred embodiment, the cellulosics are incorporated into the frappe component.

If the ratio of water soluble to water non-soluble cellulosics is greater than 3:1 the resulting product has a rough mouthfeel. A ratio less than 1:3 will result in a product having an astringent mouthfeel.

The term cellulosics is defined to include the compounds known as cellulose and modified cellulose.

Cellulose is a constituent of almost every food from the plant kingdom. These crude celluloses are impure, they contain much hemicellulose, lignin, ash and solvent soluble components. Food grade cellulose is made by the controlled hydrolysis of crude cellulose. The amorphous regions are hydrolyzed, leaving the crystalline areas intact in the form of tiny rod like microcrystals Cellulose is a non-nutritive dietary fiber chemically defined as beta-1,4-glucan. It is fibrous in form. The fibers may vary in width from about 0.005 to 0.35 mm, and in length from about 0.001 to 4 mm. Cellulose is not water soluble. This substance can be added to foods to contribute bulk without calories or form a creamy colloidal suspension which also modifies texture. When used in large amounts, however, it imparts a dry chalky mouthfeel.

Modified celluloses also called cellulose gums are prepared from purified cellulose by first swelling the cellulose fibers with sodium hydroxide and then by chemically substituting exposed hydroxyl groups. Through this process, a variety of substituted celluloses have been prepared which are soluble in water and are capable of gellation.

This substance can be added to foods to contribute bulk without calories to form a gel structure within the food and to modify the texture and mouthfeel.

Water nonsoluble cellulose, beta 1,4 glucan, suitable for use in the HSH sugarless nougats is also known as: powdered cellulose, purified cellulose, microcrystalline cellulose, and alpha cellulose. Water soluble modified cellulose suitable for use include: methylcellulose, hydroxypropylmethylcellulose, carboxymethylcellulose, hydroxypropylcellulose, methylethylcellulose, hydroxyethylcellulose and mixtures thereof. A preferred modified cellulose is hydroxypropyl methylcellulose.

It is critical that the cellulose has a fiber length that will not cause a gritty character to the nougat. Preferably the cellulose will have an average maximum fiber length of less than about 40 microns and most preferably an average maximum fiber length of less than about 20 microns.

The HSH sugarless nougat confectionery composition may also comprise a sugar alcohol. The sugar alcohol when present will increase the sweetness of the confection and aid graining of the composition. Illustrative, non-limiting examples of sugar alcohols suitable for use include: mannitol, xylitol, sorbitol, galactitol, lactitol, maltitol and mixtures thereof. The sugar alcohols when present are used in amounts up to about 45%, and preferably from about 2% to about 10%. The sugar alcohols may be incorporated entirely in the frappe component, syrup component or both.

A graining compound or agent may also be optionally employed to promote faster setting times for the final product.

The graining compound promotes faster setting times by "seeding" crystalline growth. This provides for fast crystallization forming smaller crystals resulting in soft chew product. Preferred graining agents are crystalline sugar alcohols. Illustrative, non-limiting examples of sugar alcohols include: mannitol, xylitol, sorbitol, galactitol, lactitol, maltitol and mixtures thereof. The graining compound, when used, is present in an amount from about 0.5% to about 4.0% by weight.

A preferred graining compound is mannitol.

The HSH sugarless confectionery composition may include effective amounts of further additives utilized conventionally to prepare nougat products, such as materials selected from the group consisting of pigments, colorants, oils, graining agents, preservatives, flavorings, sweeteners and so forth, and mixtures thereof.

Auxiliary sweeteners which may be utilized include those sugarless or non-sugar sweeteners well known in the art, examples of which include:

Water-soluble artificial sweeteners such as the soluble saccharin salts, i.e., sodium, or calcium saccharin salts, cyclamate salts, acesulfame-K and the like, and the free acid form of saccharin; and Dipeptide based sweeteners such as L-aspartyl-L-phenylalanine methyl ester and materials described in U.S. Pat. No. 3,492,131 and the like.

In general, the amount of auxiliary sweetener in the HSH sugarless confectionery composition will vary with the level of sweetness desired. This amount will normally be 0.001% to about 5% by weight. The artificial sweeteners described above are preferably used in amounts of about 0.005% to about 5.0% and most preferably about 0.05% to about 2.5% by weight of the final composition.

Those materials incorporated and desirable to aid in the final processing of the soft, HSH sugarless chewable nougat based product include fats, oils, preservatives, colorants and flavorings. Suitable fats and oils include those discussed above for the sugar based nougat candies.

Likewise, suitable flavorings include those discussed above for the sugar based nougats. Flavorings include compounds which modify taste perception. Particularly useful taste modifiers include the food acids. Suitable food acids include citric acid, fumaric acid, malic acid, ascorbic acid, tartaric acid, lactic acid, sorbic acid and mixtures thereof. The flavorings are generally utilized in amounts that will vary depending upon the individual flavor and may, for example range up to 2% by weight or higher.

The colorants useful in the HSH sugarless nougat include the pigments which may be incorporated in amounts of up to about 6% by weight of the composition. A preferred pigment, titanium dioxide, may be incorporated in amounts of up to about 1% by weight.

Also, the colorants may include other dyes suitable for food, drug and cosmetic applications, and known as F.D. & C. dyes and the like. The materials acceptable for the foregoing spectrum of use are preferably water-soluble. Illustrative examples include the indigo dye, known as F.D. & C. Blue No. 2, which is the disodium salt of 5,5-indigotindisulfonic acid. Similarly, the dye known as F.D. & C. Green No. 1, comprises a triphenylmethane dye and is the monosodium salt of 4-[4-N-ethyl-p-sulfo-benzylamino)diphenylmethylene]-[1(N-ethyl-N-p-sulfoniumbenzyl)- $\Delta^{2,5}$-cyclo-hexadienimine]. A full recitation of all F.D. & C. and D. & C. colorants and their corresponding chemical structures may be found in the Kirk-Othmer Encyclopedia of Chemical Technology, 3rd Edition, in Volume 6, at pages 561–595, which text is accordingly incorporated herein by reference.

The HSH sugarless nougat composition may additionally comprise a second thickening agent as a texture modifying ingredient to enhance mouthfeel in an amount of about 0.2% to about 2.5%, preferably in an amount of about 0.5% to about 1.5%. This second thickening agent is comprised of &:he same materials as the thickening agent of the frappe component and is added to the syrup and frappe mixture. The total thickening agent content of the composition is up to about 5.5% by weight.

The frappe is prepared by mixing the whipping agent with the other components of the frappe to form an aerated sponge like mass.

The syrup component is prepared by initially mixing the hydrogenated starch hydrolysate with the other components of the syrup and an amount of water to assure solution of the water soluble ingredients. The total water content is not critical, however, it is preferable to keep the initial water content below about 40% by weight of the syrup component. This mixture is charged into a suitable cooker and cooked to a final water content of about 0.75% to about 5% by weight of the total composition or to a temperature of about 155° C. to about 185° C. The syrup component is then cooled from about 110° C. to about 145° C.

Once the above steps are complete, the frappe component and the syrup component may be combined, usually by the addition of syrup component to the frappe component after the syrup component's temperature has dropped to about 110° C. to about 145° C. The resultant combination is then mixed If colorants are to be incorporated, they may be incorporated at this point. The composition is then mixed until a uniform . homogenous mass is formed. Fats are then incorporated into the composition at this time. The above composition is mixed until the temperature of the composition is less than about 90° C. but greater than about 60° C. At this point, the graining compound, if employed, is added to the composition. If flavorings are to be incorporated, they may be added into the confection also at this time. The mixture is then further mixed until uniform.

Once all of the ingredients have been blended into the mixture, the mixture is allowed to cool. The mixture may be cooled to ambient temperatures before final forming operations are completed.

A variety of final forming techniques may be utilized, depending upon the shape and size of the final product desired.

Once prepared the final composition may be processed into any desirable shape or form. Exemplary, nonlimiting shapes include squares, rectangles, spheres, tabloids and biconvex shapes. Other suitable shapes may also be employed.

In a preferred procedure, the frappe is prepared by mixing the whipping agent with the hydrogenated starch hydrolysate, the thickening agent, the cellulosics and water at ambient temperature to form an aerated sponge like mass.

Those skilled in the art will appreciate that the total amount of all ingredients (components) used in the compositions of this invention equals 100% by weight of the total composition. Also, unless stated otherwise, all percents herein are percent by weight of the total composition.

The following examples are illustrative only and should not be construed as limiting the invention in any way. Those skilled in the art will appreciate that variations are possible which are within the spirit and scope of the appended claims.

EXAMPLE 1

A layered nougat candy of this invention was prepared utilizing a compound coating having the formulation set forth in Table 2.

TABLE 2

| Ingredient | Amount (grams) |
| --- | --- |
| Paramount C[1] | 40 |
| Non Fat Milk Alternate[2] | 20 |
| Confectioners Sugar 6X | 40 |
| French Vanilla Flavor | 0.1 |

[1]Paramount C: Is reported to be partially hydrogenated vegetable oil (palm kernel, soybean, cottonseed) with lecithin and is available from Durkee.
[2]Available from Kraft Inc., under the product designation Cake Classic (P.N. 9667) reported to contain whey, sodium caseinate, non-fat milk, lecithin, calcium phosphate and calcium oxide.

The Paramount C was melted and then the non-fat milk alternate and the confectioners sugar were added thereto. The components were mixed until uniform. The flavor was then added and the resulting mixture was mixed until all components were blended.

A thin layer of the compound coating was applied to the surface of one cooled, grained nougat layer and then another nougat layer was placed in contact therewith. This was repeated until there were four nougat layers with compound coating interposed therebetween. The layers of nougat were pressed together forming nougat candy bars 1"×3"×¾" and pieces 1"×1"×¾" that maintained their integrity as one single piece of candy until the layers were easily peeled off.

The nougat candy was wrapped in silicone paper and placed in fin seal pouches. After about 3 months the nougat candy was tested for separability of the individual nougat layers. The nougat layers were found to be easily separable from each other.

EXAMPLE 2

Following the procedure of Example 1, a layered nougat candy of this invention was prepared using a compound coating having the formulation described in Table 2 of Example 1, except no flavoring was added.

Two nougat candies were produced having a total of four layers wherein the layers were alternating layers of lemon and lime flavored nougat. A thick layer of compound coating was applied to the alternating layers of nougat. The layers were pressed together with a rolling pin to form a nougat bar 1"×4"×¾" and a nougat piece 1"×1"×¾". The total amount of compound coating applied was an average of about 18.33% by weight based on the total weight of the nougat candy bar.

EXAMPLE 3

Following the procedure of Example 2, a 4 layer nougat bar 1"×3"×¾", of this invention, was formed from 4 layers of 1"×3"×3/16" nougat strips. The total amount of compound coating applied was 2.7% by weight, based on the weight of the total nougat bar.

EXAMPLE 4

Following the procedure of Example 1, a nougat candy piece 1"×1"×¾", of this invention, was formed having 4 layers of cooled, grained nougat using the compound coating composition given in Table 3.

TABLE 3

| Ingredient | Amount (grams) |
| --- | --- |
| Colored Confectionery Coating | 3 |
| Pearl White Confectionery Coating[1] | 97 |
| Lecithin | 0.04 |

[1]Available from Ambrosia Co., and reported to contain sugar, partially hydrogenated palm kernel oil, nonfat dry milk, clarified butter oil, lecithin, artificial flavoring, and salt.

The colored confectionery coating was prepared from 9 g of pearl White Confectionery coating and 1 g of F.D.&C. Red No. 40 by melting the confectionery coating using medium heat (not higher than 125° F.), adding the color, and mixing until uniform.

The compound coating was prepared by melting the colored confectionery coating and the Pearl White Confectionery Coating using medium heat (no more than 25° F.) and then mixing until uniform. Then the lecithin was added and mixed until a uniform mixture was obtained.

The layered candy nougat formed was wrapped in silicone paper and placed in fin sealed pouches. After about 3 months the nougat candy was tested for separability of the individual nougat layers. The layers were found to be easily separable.

EXAMPLE 5 (Comparative)

A layered nougat candy, not of this invention, was prepared using a "tender type" candy interposed between the layers of cooled, grained nougat. The "tender type" candy was prepared from the formulation set forth in Table 4.

TABLE 4

| | Amount (grams) |
| --- | --- |
| Gel Base | |
| Sodium Citrate | 0.89 |
| Citric Acid | 0.88 |
| Water (deionized) | 45.00 |
| Pectin | 1.75 |
| Sugar, fine granular | 63.00 |
| Fro-Dex CS Solids[1] | 10.50 |
| | 122.02 |
| Finished Batch | |
| Gel Base | 102.6 |
| Citric Acid | 0.7 |
| Water, deionized | 1.4 |
| | 104.7 |

[1]Fro-Dex CS Solids is the product designation for a maltodextrin type of low D.E. corn syrup solids available from American Maize Co.

The "tender-type" candy was prepared by boiling all-pectin gel base ingredients to about 78–83% solids and adding acidulants.

A thin layer of the "tender type" candy was placed between 4 alternating 3/16" thick strips of nougat (about 1"×1"). The layers were alternately flavored lemon and lime. The candy pieces were wrapped in silicone paper and placed in a fin sealed pouch. After about one day a piece of layered nougat candy was removed from its sealed pouch and tested for peelability of the layers. The layers peeled off but not cleanly —i.e., parts of the adjoining layer stuck to the layer being peeled off.

On the third day after making the nougat candy another piece was tested for peelability of its layers. The layers were difficult to peel, pieces of the adjoining layer stuck to the layer being peeled, and there was a softening of the surfaces in contact with the "tender-type" candy interposing layer.

EXAMPLE 6 (Comparative)

A layered nougat candy, not of this invention, was prepared using a fondant interposed between the layers of cooled, grained nougat. The fondant was prepared from the formulation described in Table 5.

TABLE 5

| Ingredient | Amount (grams) |
| --- | --- |
| Amerfond[1] | 41.67 |
| Corn Syrup | 4.17 |
| Water | 4.16 |

[1] Product designation for fondant sugar available from Amstar.

The fondant was prepared by mixing all the ingredients until uniform.

A nougat candy was prepared from four alternating layers of lemon and lime nougat 3/16" thick. The fondant was applied as a thin layer (sufficient to cover the surface) to the alternating layers of nougat to produce a layered nougat candy. The layered candy pieces were wrapped in silicone paper and placed in fin seal pouches.

After one day, a layered nougat candy was tested for peelability of the layers. The layers peeled off but not cleanly, parts of the preceding layer adhered to the layer being peeled off.

On the third day after making the layered nougat candy, the layered nougat candy was tested again for peelability. The layers were impossible to peel because they completely stuck to each other.

The invention thus being described, it will be obvious that the same may be varied in many ways. Such variations are not to be regarded as a departure from the spirit and scope of the invention and all such modifications are intended to be included within the scope of the claims.

What is claimed is:

1. A chewable, peelable, nougat composition consisting essentially of at least two layers of nougat and a compound coating or cream filler layer comprising an edible fat, a dry milk substitute and a sweetener, said compound coating or cream filler layer interposed between said nougat layers to provide cohesiveness and easy separability thereto.

2. The composition of claim 1 wherein said compound coating comprises:
    (a) an edible fat having a melting point of about 76° to about 100° F.;
    (b) a milk substitute selected from the group consisting of non-fat milk powder, imitation milk powder, non-dairy creamers, full cream powder, full milk powder, and mixtures thereof; and
    (c) a sweetener.

3. The composition of claim 2 wherein said edible fat is selected from the group consisting of palm kernel oil, hydrogenated palm kernel oil, fractionated palm kernel oil, palm oil, cottonseed oil, coconut oil, soy oil, peanut oil, safflower oil, sunflower oil, and mixtures thereof.

4. The composition of claim 3 wherein said edible fat is hydrogenated palm kernel oil.

5. The composition of claim 2 wherein said milk substitute is non-fat milk powder.

6. The composition of claim 2 wherein said sweetener is selected from the group consisting of sucrose, corn syrup solids, and mixtures thereof.

7. The composition of claim 6 wherein said sweetener is sucrose.

8. The composition of claim 7 wherein the milk substitute is non-fat dry milk.

9. The composition of claim 8 wherein the fat is hydrogenated palm kernel oil.

10. The composition of claim 2 which further comprises a flavoring agent.

11. The composition of claim 2 wherein said edible fat is present in an amount of about 25% to about 50% by weight; said milk substitute is present in amounts of about 15% to about 30% by weight; and said sweetener is present in amounts of about 30% to about 60% by weight; wherein said % by weight is based on the weight of the compound coating.

12. The composition of claim 11 wherein said edible fat is hydrogenated palm kernel oil, said milk substitute is non-fat milk powder; and said sweetener is sucrose.

13. The composition of claim 1 wherein said compound coating is present in amounts of about 1.5% to about 22% by weight of said chewable, peelable nougat composition.

14. A chewable, peelable, sugarless nougat composition consisting essentially of at least two layers of nougat and a compound coating or cream filler layer comprising an edible fat, a dry milk substitute and a sweetener, said compound coating or cream filler layer interposed between said nougat to provide cohesiveness and easy separability thereto.

15. The composition of claim 14 wherein said compound coating comprises:
    (a) an edible fat having a melting point of about 76° to about 100° F.,
    (b) a milk substitute selected from the group consisting of non-fat milk powder, imitation milk powder, non-dairy creamers, full cream powder, full milk powder, and mixtures thereof; and
    (c) a sugarless sweetener.

16. The composition of claim 15 wherein said sugarless sweetener is selected from the group consisting of: sugar alcohols, artificial sweeteners, dipeptide based sweeteners, and mixtures thereof.

17. The composition of claim 15 wherein said fat is present in an amount of about 25% to about 50% by weight; said milk substitute is present in an amount of about 15% to about 30% by weight; and said sweetener is a sugar alcohol present in an amount of about 35% to about 50% by weight; said % by weight being based upon the weight of said coating.

18. The composition of claim 17 wherein said fat is hydrogenated palm kernel oil, said milk substitute is non-fat dry milk, and said sweetener is selected from the group consisting of sorbitol, mannitol, xylitol, and mixtures thereof.

19. The composition of claim 15 which further comprises a flavoring agent.

20. The composition of claim 15 wherein said fat is selected from the group consisting of palm kernel oil, hydrogenated palm kernel oil fractionated palm kernel oil, palm oil, cottonseed oil, coconut oil, soy oil, peanut oil, safflower oil, sunflower oil, and mixtures thereof.

21. The composition of claim 15 wherein the sweetener is sorbitol.

22. The composition of claim 14 wherein said compound coating is present in amounts of about 1.5 to about 22% by weight of said chewable, peelable sugarless nougat composition.

23. A method of making a chewable, peelable multi-layered nougat candy with separable individual layers comprising interposing a compound coating or cream filler layer comprising and edible fat, a dry milk substitute and a sweetener, between each successive nougat layer and thereafter compressing the individual nougat layers together forming a multi-layered nougat having cohesive and peelable nougat layers.

* * * * *

UNITED STATES PATENT AND TRADEMARK OFFICE
CERTIFICATE OF CORRECTION

PATENT NO. : 4,911,937

DATED : March 27, 1990

INVENTOR(S) : Vincent Corsello, Carolina Calayan, and Allan H. Graff

It is certified that error appears in the above-identified patent and that said Letters Patent is hereby corrected as shown below:

On the title page, under item [19], "Crosello" should be --Corsello--; and
in item [75], Vincent G. Crosello" should be
--Vincent G. Corsello--.

Signed and Sealed this

First Day of October, 1991

*Attest:*

HARRY F. MANBECK, JR.

*Attesting Officer*      *Commissioner of Patents and Trademarks*